United States Patent Office 3,108,037
Patented Oct. 22, 1963

3,108,037
REPELLING INSECTS
Lyle D. Goodhue and Raymond L. Cobb, Bartlesville, and Kenneth E. Cantrel, Dewey, Okla., assignors to Phillips Petroleum Company, a corporation of Delaware
No Drawing. Filed Sept. 19, 1961, Ser. No. 139,081
5 Claims. (Cl. 167—30)

This invention relates to a method of repelling insects. In one of its aspects, the invention relates to repelling an insect employing an effective amount of a compound having the following structural characteristics

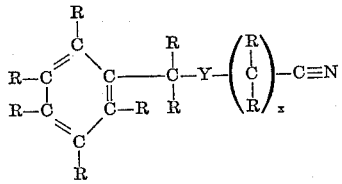

(I)

wherein each R is selected from the group consisting of hydrogen, methyl, and ethyl, Y is selected from the consisting of —S— and

and $x$ is an integer of from 1 to 6, inclusive. In another aspect of the invention, it relates to an insect repellent composition containing at least one of the compounds herein defined.

It has now been found that compounds of the structural characteristics herein defined possess insect repellency and are particularly effective for repelling roaches.

An object of this invention is to provide a method for repelling insects. Another object of the invention is to provide a composition for use in repelling insects. A further object of this invention is to effectively repel roaches.

Other aspects, objects and the several advantages of this invention will become apparent from a study of this disclosure and the appended claims.

According to the present invention, compounds having the structural characteristics of Formula I, as defined herein, have been found to possess particular applicability for the repelling of insects such as roaches.

Some examples of compounds of the above general formula which can be employed as repellents according to the process of this invention are:

3-(benzylthio)propionitrile
α-Methylbenzylsulfinylacetonitrile
3-(2,3-dimethylbenzylthio)propionitrile
4-(α,α,2,3,4-pentamethylbenzylsulfinyl)butyronitrile
4 - (α,2,6 - trimethylbenzylthio) - 2,2,3,3,4 - pentamethylvaleronitrile
3-(α,α-diethylbenzylthio)-2-ethylpropionitrile
5-(1,3,5-triethylbenzylsulfinyl)-5-ethylcaprylonitrile
7-(benzylthio)enanthonitrile
7 - (α,α,2,3,4,5,6 - heptaethylbenzylthio) - 2,2,3,3,4,4,5,5,6,6,7-undecaethylpelargonitrile The repellents of this invention can be applied by conventional methods which include use of solutions, emulsions, dusts, wettable powders, aerosols and the like. Solvents which can be employed include such materials as naphtha, kerosene, toluene, cyclohexanone, acetone, etc. One particularly effective solvent which can be used is an isoparaffinic hydrocarbon boiling in the approximate range of 260–800° F. which is sold under the trademark Soltrol. These isoparaffinic hydrocarbons are prepared by the HF catalyzed alkylation of paraffins with olefins.

The amount of repellent in the solutions, emulsions, etc. can vary over a wide range, but will generally be within the range of from 0.05 to 20 weight percent. In some instances, even lower concentrations can be used, and the upper limit is dictated primarily by economics.

When applying the repellents of this invention to an area from which it is desired to repel insects such as roaches, the method of application will be chosen so as to deposit from 0.1 to 20 grams per 100 square feet. It is also to be understood that these repellents can be used as space sprays, employing such means as aerosol bombs.

The compounds of the above general formula can be prepared by a variety of methods. The general method of preparing the thioethers of the above general formula is by the addition of benzyl mercaptan or substituted benzyl mercaptans to unsaturated nitriles. In this type of reaction, a basic catalyst is generally employed if the mercaptans are to be added to unsaturated nitriles wherein the double bond is in the "2-" position such as acrylonitrile. This type of reaction is the well known condensation reaction and is described by Szabo et al., JACS, vol. 70, 3668 (1948). If the mercaptan is to be added to higher molecular weight olefinic nitriles wherein the double bond is farther removed from the nitrile group, the addition is most conveniently carried out in the presence of a free radical catalyst such as a peroxide. Other methods such as the reaction of the sodium mercaptide of the various benzyl mercaptans with a halo-substituted nitrile can also be used. The compounds of the above formula which have a thioether group can be easily converted to the corresponding sulfinyl compounds by oxidation with hydrogen peroxide or an organic peracid such as peracetic acid.

EXAMPLE

A run was carried out in which 3-(benzylthio)propionitrile was synthesized and tested as a repellent for roaches.

In the synthesis of this compound, 310 grams (2.5 mols) of benzyl mercaptan were dissolved in 500 cc. of denatured alcohol under nitrogen, and to this was added 50 cc. of a 25 percent by weight methanol solution of trimethylphenylammonium hydroxide. The addition of this basic catalyst was carried out under nitrogen. To the resulting mixture was then added 250 cc. of acrylonitrile. The addition was carried out gradually requiring about 1 hour, and during the addition, the temperature gradually rose to about 70° C. from the initial level of 25° C. After all of the nitrile had been added, the alcohol was removed under reduced pressure, and the remaining oily residue was poured into cold water. After separating the phases, the organic phase was extracted with ether and washed with water, dilute aqueous HCl and again with water. The washed material was then dried over sodium sulfate and then over calcium sulfate. Distillation of the dried material yielded 414 grams of 3-(benzylthio)propionitrile. This material boiled at 135° C. at 1 mm. Hg absolute pressure and had a refractive index $n_D^{20}$ equals 1.5646. The calculated yield of this material was 94 percent. For comparison, Szabo et al., JACS, vol. 70, 3668 (1948), shows 3-(benzylthio)-propionitrile as having a boiling point of 131° C. at 0.9 mm. Hg. absolute pressure and a refractive index $n_D^{20}$ equals 1.5655.

The above prepared compound was tested as a roach repellent in the following manner. In these tests, 3″ x 5″ cards were dipped in a 2 percent by weight acetone solution of the candidate compound, after which the cards were hung in a hood over night. The next day, two cards, including one untreated check, were placed in clear plastic cages, 8″ x 8″ x 12″, fitted with a screened top, and containing approximately 1,000 German roaches. The cards were placed so as to lean against the sides of the cage. The number of roaches on each of the cards was determined after 1 hour, and again after 2 hours. Following this test, the cards were hung under the hood for 1 week, and the test was repeated.

In still another test, treated cards were tested which had hung in the hood for 2 weeks after dipping. The results of these tests are expressed below as Table I.

Table I

| Compound | Roaches on Card | | Total Roaches | Percent Repellent [1] |
|---|---|---|---|---|
| | After 1 hr. | After 2 hrs. | | |
| 3-(benzylthio)propionitrile | 43 | 32 | 74 | 82 |
| Untreated card | 204 | 216 | 420 | |
| SAME CARDS AFTER ONE WEEK | | | | |
| 3-(benzylthio)propionitrile | 119 | 123 | 342 | 37 |
| Untreated Card | 266 | 276 | 542 | |
| DIFFERENT CARDS TWO WEEKS AFTER DIPPING | | | | |
| 3-(benzylthio)propionitrile | 114 | 115 | 229 | 45 |
| Untreated Card | 201 | 214 | 415 | |

[1] Percent repellency=100 minus total roaches on untreated card × 100/ total roaches on untreated card.

In still another series of tests by essentially the same procedure, 3-(benzylthio)propionitrile was still exhibiting substantially 100 percent repellency to German roaches after 21 days.

The toxicity of 3-(benzylthio)propionitrile to mammals was determined by administering a 10 percent corn oil solution of the compound to rats by means of a stomach tube and syringe. As determined by this test, the $LD^{50}$ was greater than 1000 mg. per kilogram.

Tests with other compounds falling within this disclosure yield results similar to those obtained in the example of the invention above given.

Reasonable variation and modification are possible within the scope of the foregoing disclosure and the appended claims to the invention the essence of which is that compounds of formula I have been found to be effective insect combatting agents, particularly insect repellents, which are particularly effective against roaches.

We claim:

1. A method of repelling roaches which comprises subjecting said roaches to the action of a compound having the following structural characteristics

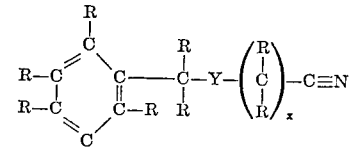

(I)

wherein each R is selected from the group consisting of hydrogen, methyl, and ethyl, Y is selected from the group consisting of —S— and

and $x$ is an integer of from 1 to 6, inclusive.

2. A method of repelling an insect which comprises subjecting said insect to the action of a compound having the structural characteristics of Formula I.

3. A method of repelling an insect which comprises subjecting said insect to a compound selected from the group consisting of 3-(benzylthio)propionitrile
α-Methylbenzylsulfinylacetonitrile
3-(2,3-dimethylbenzylthio)propionitrile
4-(α,α,2,3,4-pentamethylbenzylsulfinyl)butyronitrile
4 - (α,2,6 - trimethylbenzylthio) - 2,2,3,3,4 - pentamethylvaleronitrile
3-(α,α-diethylbenzylthio)-2-ethylpropionitrile
5-(1,3,5-triethylbenzylsulfinyl)-5-ethylcaprylonitrile
7-(benzylthio)enanthonitrile
7 - (α,α,2,3,4,5,6 - heptaethylbenzylthio) - 2,2,3,3,4,4, 5,5,6,6,7-undecaethylpelargonitrile 4. A method of repelling an insect which comprises subjecting said insect to the action of an effective quantity of 3-(benzylthio)propionitrile.

5. A method of repelling a roach which comprises subjecting said roach to the action of 3-(benzylthio)propionitrile.

References Cited in the file of this patent
UNITED STATES PATENTS
2,919,224    Heininger _____ Dec. 29, 1959